Figure 1:
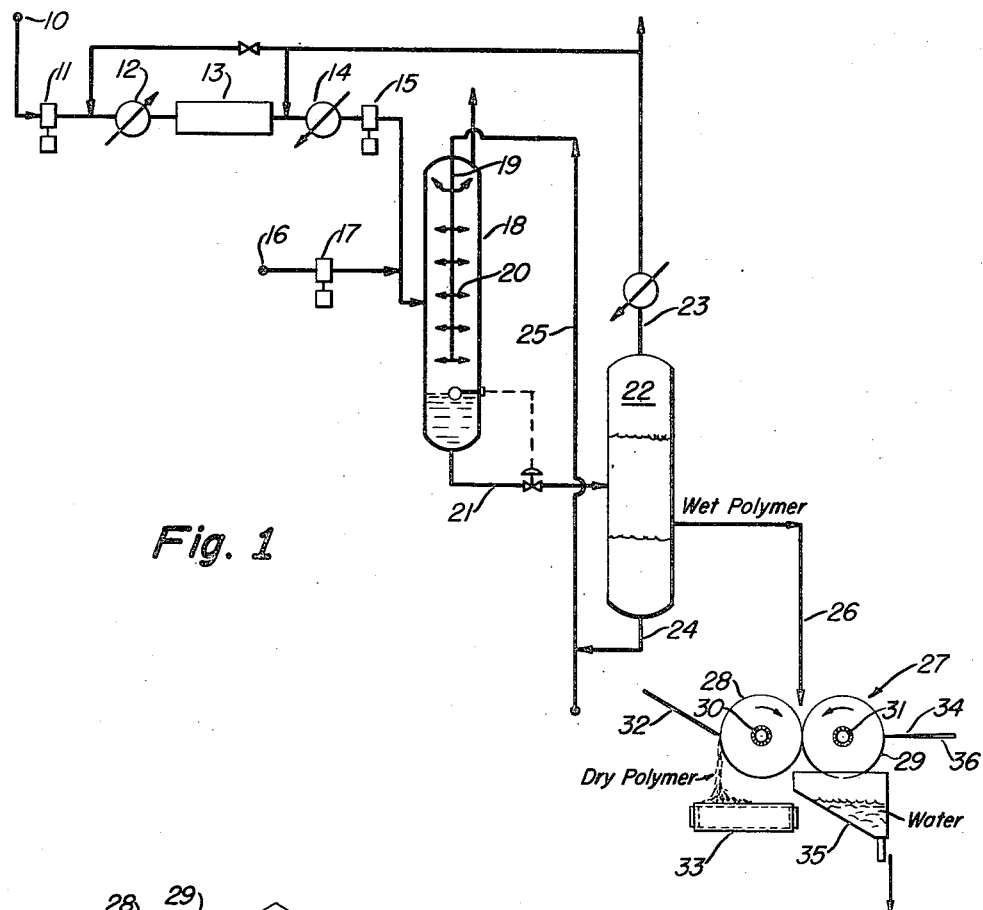

Nov. 27, 1956  R. S. BETTES, JR  2,771,689
REMOVAL OF WATER FROM SOLID POLYMERS
Filed March 26, 1953  2 Sheets-Sheet 1

INVENTOR.
Richard S. Bettes, Jr.
BY
ATTORNEY

Nov. 27, 1956  R. S. BETTES, JR  2,771,689
REMOVAL OF WATER FROM SOLID POLYMERS
Filed March 26, 1953  2 Sheets-Sheet 2
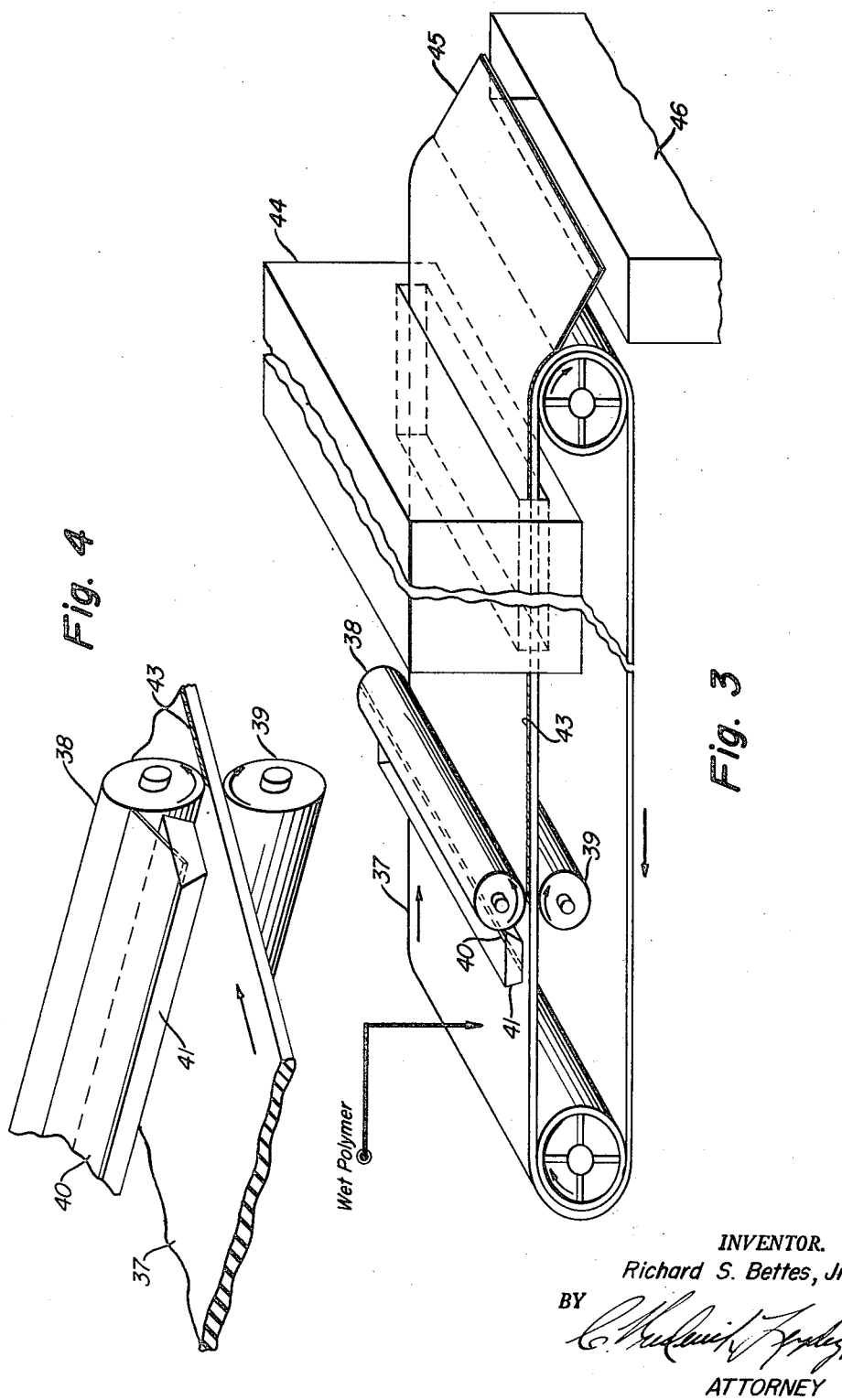
INVENTOR.
Richard S. Bettes, Jr.
BY
ATTORNEY United States Patent Office 2,771,689
Patented Nov. 27, 1956

2,771,689

REMOVAL OF WATER FROM SOLID POLYMERS

Richard S. Bettes, Jr., Park Forest, Ill., assignor to Standard Oil Company, Chicago, Ill., a corporation of Indiana Application March 26, 1953, Serial No. 344,726

3 Claims. (Cl. 34—17)

This invention relates to the removal of physically combined water from solid polymerization products. More particularly it relates to the removal of occluded or entrained water from solid polyethylene produced by the catalytic polymerization of gaseous ethylene.

The polymerization of unsaturated hydrocarbon gases to solid polymers may be carried out by numerous techniques taught in the art. A polymerization process wherein gaseous ethylene is catalytically polymerized in the presence of a peroxydicarbonate ester catalyst is described in U. S. 2,475,643. Because of the tacky nature of polyethylene at polymerization temperatures, its adherence to the reactor walls is a problem. In accordance with the process described in the above patent, a continuous water spray is directed on the walls to prevent this adherence but by so doing a substantial quantity of water becomes physically combined with the polymer as it is formed. In other polyethylene processes water may be combined with the polymer in entirely different ways, e. g. in many processes an organic solvent is employed as a polymerization medium which is removed from the polymer by steaming or by introducing the solvent-laden polymer into boiling water; water thereby replaces the solvent. Regardless of the manner in which the water becomes bound with the polymer, it is necessary that it be freed therefrom to obtain a commercially valuable product.

Whereas complete evaporative air drying of water-laden polymer may be possible it is highly impracticable in those instances where water contents greater than about 50% are encountered. It is far more advantageous in such cases to mechanically remove the large bulk of the water and then, if necessary, to subject the almost-dry polymer to a final air drying step. Such mechanical pretreatment accelerates and reduces the cost of the overall dewatering process considerably, not only because of the small quantity of water required to be removed by evaporation but also because the compaction of the polymer permits the used of higher efficiency drying equipment, such as direct rotary dryers and the like, without excessive dusting or other difficulties ordinarily encountered with loose finely divided material.

It is an object of the present invention to provide a method for mechanically removing physically combined water from solid polymers. A further and more particular object is to provide a method for mechanically separating the bulk of occluded or entrained water from a wet polyethylene product comprising more than about 50% water and even as much as 85 to 90% water. A still further object is to provide a method whereby essentially water-free polyethylene may be recovered from a process wherein ethylene is polymerized in the presence of water. These and additional objects will be apparent from the following detailed description when read in conjunction with the attached drawings.

Water entrained in polyethylene is rather loosely held and the major proportion of it may be removed with relatively little pressure. Unless, however, the water expressed from the polymer is withdrawn immediately, a substantial portion of it recombines on the surface of the pressed polymer. Whereas such water may be more easily removed from the polymer by air drying than previous to the pressing operation, it would obviously be far better if, as the water is expressed from the polymer, it could be physically separated or withdrawn therefrom.

Efforts to dewater the polymer by introducing it to a pair of unheated milling rolls, while successful in removing appreciable quantities of water, have failed to result in a reasonably water-free product. The polymer adheres to each roll and a film of water consistently forms between polymer and roll. When the polymer is stripped from the rolls, a considerable quantity of water comes with it and remains on the surface thereof. In a modification of this type of pressing operation, the temperature of one roll has been raised sufficiently to vaporize the water in the polymer. It has been found that under such conditions the polymer preferentially adheres to the hot roll. Whereas this offers certain advantages over two rolls maintained at the same temperature, the thermal requirements necessary to boil off the water in this manner and the additional problems inherent in removing the water as steam make a process permitting lower heat requirements and removal of water as liquid potentially more valuable.

It has now been discovered, in accordance with a preferred embodiment of the present invention, that not only can the temperature of the heated roll be maintained considerably below that required to drive the water off as steam, but that liquid water expressed from the polymer can be immediately removed from proximity to the pressed polymer by adherence to the surface of the cooler roll. It is then a simple matter to wipe the liquid film from the roll surface. The temperature of the hot roll is maintained sufficiently high to cause the polymer to adhere preferentially thereto and it may be readily stripped from the roll by means of a suitable doctor blade. Employing an operation of this type, almost complete removal of water in a polymer containing as much as 5 to 8 pounds of water per pound of polymer has been attained (such a product, a very finely divided fluff which is seemingly dry yet contains as much as 85% water, is that usually resulting from the process described in U. S. 2,475,643). Relatively, little air drying is required on a pressed product of this type and the attendant thermal requirements are substantially reduced. Another embodiment resides in the use of a continuous conveyor belt of canvas, plastic, sheet metal, or other suitable material passing between a pair of cooperating, closely spaced rolls disposed in a vertical plane, i. e. one above the other, with the belt riding over the lower roll. The water-laden polymer is fed on to the conveyor belt and as the belt transports the polymer between the rolls the water is expressed from the polymer and adheres to the upper roll from which it may be readily wiped in a manner similar to that set forth above. In this instance, the polymer adheres to the conveyor belt (which need not be heated) and is readily removable therefrom.

In accordance with the preferred embodiment of the present invention, there is employed a press comprising closely spaced parallel metal rollers into the nip of which water saturated polymer (containing at least about 50% by weight of water) is fed. These closely spaced rollers counterrotate and force the water from the polymer as it is fed therebetween. The polymer should be introduced from the above thus requiring the rolls to be disposed in a substantially horizontal plane. By maintaining one roll at a temperature between about 150° F. and about 225° F., preferably between about 175° F. and 210° F., and the other between about 35° F. and about 80° F., preferably between about 40° F. and about 70° F., the substantially water-free polymer will adhere to the hot roll and polymer-free water will collect on the cool roll. The polymer may then be scraped from the surface of the hot roll by a suitable doctor blade while the water is continuously removed from the cool roll, preferably by a rubber wiper blade which skims the water from the roll causing it to fall into a trough disposed therebelow. Substantially all of the polymer and water fed to the press adheres to the respective rolls at low roll speeds (hereinafter referred to in detail) but at higher speeds some polymer and/or water may pass between the rolls without adhering thereto. This material may be recycled to the polymer entering the press.

In the drawings:

Fig. 1 represents a partially diagrammatic representation of a polymerization process embodying the preferred water removal technique.

Figure 2:
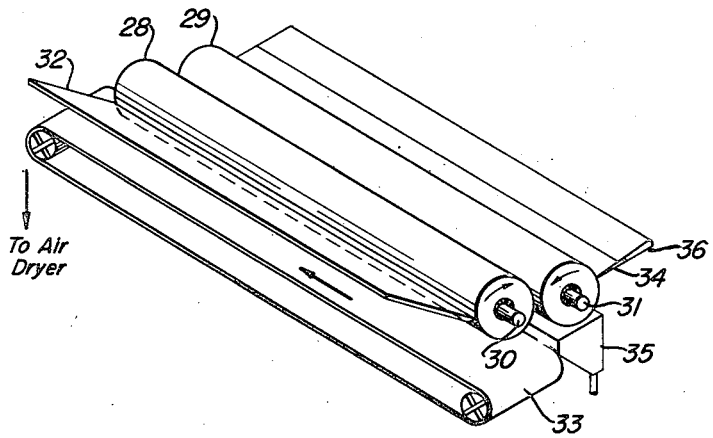

Fig. 2 provides a more detailed perspective view, with parts removed, of that portion of the process shown in Fig. 1 which particularly concerns polymer dewatering.

Fig. 3 provides a perspective view of an alternative embodiment of the mechanical dewatering equipment of the present invention.

Fig. 4 is a partial enlargement view showing more clearly the dewatering roll and wiper assembly shown in Fig. 3.

As indicated above, this invention is concerned generally with removing physically bound water from polymeric materials, particularly polyethylene. The manner in which water may become entrained in the polymer is not, per se, a part of the invention but because the polymerization process described in U. S. 2,475,643 is one very definite way in which the problem might arise, and to which the present invention has especial application, the following detailed description has particular reference thereto. It should be understood that the polymerization and separation of uncombined carrier water shown in Fig. 1 is a diagrammatic representation essentially corresponding to the process described in U. S. 2,475,643.

Referring now to Fig. 1, gaseous ethylene is passed from source 10 through a pump or compressor 11 and heater 12 into a purifier 13 wherein oxygen, nitrogen, and sulfur-containing materials are removed from the ethylene stream. Various methods of removing oxygen are known to the art; some of these which are particularly suitable are described in British Patent 560,497. From purifier 13 the ethylene charging stock is passed into heat exchanger 14 wherein its temperature is brought to the temperature which it is desired to maintain in polymerization reactor 18. The ethylene is compressed in compressor 15 to the desired polymerization pressure, joined thereafter by cold peroxydicarbonate catalyst forced from a refrigerated vessel (not shown) through valved line 16 by pump 17 and introduced to the reactor.

Ethylene is polymerized in the reactor 18 and the resultant polymer which tends to coat the reactor walls is removed by sprays of water. This water may be introduced into the polymerization reactor through a centrally located vertical manifold such as is indicated diagrammatically in the drawing by 19 with spray heads 20. The liquid is sprayed against the confining interior surface of the polymerization reactor under sufficient pressure to prevent undue accumulation of solid ethylene polymer in the reactor. This introduction of liquid may be continuous or intermittent depending upon the rate of accumulation of ethylene polymer.

The water slurry of ethylene polymer passes into a sump in the lower portion of the reactor and leaves the reactor by line 21.

The slurry of polymer in water is maintained in dispersed condition in the bottom of tower 18 by a mechanical mixing device (not shown). The slurry then enters separator 22 wherein gaseous ethylene is released via line 23 by rapidly reducing the pressure on the stream.

The flow of slurry is automatically regulated by a valve in line 23 which is operated by a float in the base of tower 18. The slurry, when permitted to settle, forms essentially two layers, the top layer comprising wet polymer and the lower layer substantially polymer-free water. The aqueous layer is recycled via lines 24 and 25 to the top of reactor 18. The polymer (which ordinarily contains from about 5 to about 8 pounds of water per pound of polymer) is withdrawn from separator 22 through line 26 by which it is fed into the nip of press 27 comprising opposed counterrotating rolls 28 and 29. Roll 28 is heated to a temperature in the range of from about 150° F. to about 225° F. and preferably from about 175° F. to about 210° F. by the introduction of steam and/or hot water into the roll via line 30 concentric to the axis of the roll and is drawn off at the opposite end of the roll. Water at a relatively low temperature, e. g. about 50° F., is preferably introduced to roll 29 by means of line 31 concentric to the axis of that roll and is likewise drawn off from an outlet at the other end of the roll (not shown). The cool roll should be maintained above water's freezing point but below about 80° F. and for most satisfactory results, between about 40° F. and about 70° F.

The two rolls rotate toward each other, from top to bottom, pressing the wet polymer therebetween. The distance between rolls should be adjustable by means not shown and should be from about 0.001 inch to about 0.010 inch and preferably from about 0.003 to about 0.006 inch. As the rolls turn, the essentially water-free polymer adheres to the hot roll whereas the water expressed therefrom is picked up on the surface of the cool roll. The substantially water-free polymer is scraped from the surface of the roll by doctor blade 32 and falls on to conveyor 33 disposed below roll 28. The water on the surface of roll 29 is removed therefrom by wiper blade 34, preferably disposed at about 270° from where the water was picked up, and falls into the trough 35 disposed therebelow. Other suitable means for removing the water from the cool roll, e. g. a suction device disposed along the surface of the roll, etc. may likewise be used. Wiper blade 34 is preferably horizontally disposed in the plane of the axes of the rolls and in contact with the roll along its entire length. Trough 35 extends under the lower nip of the rolls so that any water or polymer passing directly between the rolls and not adhering to one or the other will fall into the trough and not on the conveyor. With proper roll speeds and other variables controlled in accordance herewith the amount of any such water or polymer is small.

Stainless steel, chrome plate, copper, brass, etc. are all suitable materials for the peripheries of the rotating rolls. The principal requirement is one of smoothness and relative hardness to withstand the scraper blade's action. Also an important consideration is freedom from rust and in this regard stainless steel and chrome plated surfaces are preferred. The pressure of the doctor blade against the hot roll need not be great for if the surface finish is good, the polymer can readily be stripped therefrom. It is ordinarily desirable that this pressure be readily adjustable. The wiper on roll 29 may be of any suitable material. Rubber is particularly desirable and has been employed with success.

In Fig. 2 the arrangement of the press rolls and various cooperating parts, such as continuous belt conveyor, water removal trough, polymer removal blade, water wiper blade, etc. are more clearly shown. The means by which the rolls are turned, the manner in which the doctor blade and the wiper are held in contact with the rolls and certain other structural details are not shown in the drawings inasmuch as one skilled in the art can readily assemble the equipment of the type shown to operate in the manner described. Rolls 28 and 29 are preferably, although not necessarily, geared together with a driving means connected to only one roll. The surface of conveyor 33 may be of canvas, rubber, or other suitable material and is preferably coated or impregnated with polyfluoroethylene polymer to which polyethylene does not readily adhere. Commercial polyfluoro-products of this type are "Kel-F" of The M. W. Kellogg Co. and "Teflon" of E. I. du Pont. Wiper blade 34 is firmly held in expandable clamping fixture 36. Replacement wipers can readily be inserted in said fixture when the one in service has become worn. Wiper blade 34 in fixture 36 is preferably spring-loaded against the roll to compensate for wear of the blade.

Fig. 3 shows a typical arrangement of equipment for dewatering polymer in accordance with an alternative embodiment of the invention. Water-laden polymer is deposited on conveyor belt 37 from settler 22 (not shown in this drawing) and is fed into the nip of dewatering roll 38. Roll 38, disposed above the conveyor belt a distance of from about 0.001 to about 0.01 inch and preferably from about 0.003 to about 0.006 inch, cooperates with the idler roll 39 to express the water from the polymer passing therebetween. The water so expressed is picked up in a thin film on the surface of dewatering roll 38 (rotating in the manner shown by the arrow). As roll 38 turns the water on its surface is continuously removed by wiper blade 40 and passes into trough 41 from which it is withdrawn by line 42.

The pressed polymer adheres to the surface of conveyor belt in a relatively thin sheet 43 and passes through air dryer 44 wherein any water on the surface is evaporated. After leaving the dryer the polymer is scraped from the belt by blade 45 and falls through chute 46 to storage or, if desired, to additional air drying. It should be understood that the number and type of air dryers employed, the location of such dryers, etc. are not, per se, a part of the present invention and are subject to considerable variation. As a practical matter, it is ordinarily desired to obtain an ultimate product which is completely dry. To accomplish this, an air drying step of some type at a point after the pressing operation is almost always required. Accordingly, it is preferred, in accordance herewith, to subject the pressed polymer to a final drying step but such drying step may, of course, be omitted if a product containing a slight amount of water is a suitable end product.

Fig. 4 is an enlarged partial view showing somewhat more clearly the relationship of dewatering roll 38, wiper 40 and trough 41.

Set forth in Table 1 below are the results of dewatering a polymer, containing 5.2 pounds of water per pound of polymer, in an apparatus of the type shown in Fig. 2 wherein the rolls, which were separated by a distance of 0.003 inch, were 3 inches long and had a diameter of 4.2 inches. The surface of the rolls was chrome-plated and the hot roll was maintained at a temperature of 210° F. while that of the cool roll was 50° F.

TABLE 1

| Roll Speed | H₂O Content of Pressed Polymer Adhering to Hot Roll | Percent of Total Polymer Introduced to Press Removed from Hot Roll | Production Rate From Hot Roll, lb./ft.²/min. |
| --- | --- | --- | --- |
| 3 | 0.07 | 99.4 | 0.0065 |
| 6 | 0.04 | 97.5 | 0.0085 |
| 12 | 0.33 | 91.6 | 0.0114 |
| 24 | 0.85 | 85.7 | 0.0140 |
| 48 | 1.20 | 80.0 | 0.0176 |

As is apparent from the above table, increased roll speeds resulting in an increase in the amount of wet polymer charged is accompanied by an increase in water content of pressed polymer as well as a reduction in the percentage of polymer adhering to the hot roll. Obviously, adjustment of roll speed to accomplish the most desired result, be it lowest water content or highest charge rate, is a simple matter.

The practical value of mechanically removing the bulk of the water from wet polymers, as is contemplated herein, is emphasized when one compares tests wherein similar polyethylene products of essentially the same water content (about 6 pounds of water per pound of polymer) were brought to total dryness by (1) air drying and (2) by mechanically dewatering through a hot and cold roll press followed by air drying. Complete air drying (oven maintained at about 180° F.) of the material took at least 5 hours whereas first mechanically dewatering and then drying the pressed polymer under the same conditions as the unpressed polymer took only about 48 minutes. It is particularly interesting that comparative drying rate curves (obtained by plotting moisture content as a function of drying rate) for pressed (mechanically dewatered) polymer and unpressed water-laden polymer are much the same, indicating that the pressing operation does not result in any increased difficulty in removing the last traces of water remaining in the polymer after being mechanically dewatered.

In the description of the operation of the process reference to many pieces of apparatus which would be used in practice have been omitted for purposes of simplicity. Such auxiliary equipment includes flow controllers, temperature measuring and recording devices, valves, meters, pressure gauges, and many others. Such apparatus, the operation and purpose of which are well understood by those skilled in such art, will of course be included in plant designs.

Having thus described my invention, what I claim as novel and desire to protect by Letters Patent is as follows:

1. The process of removing physically bound water from a solid, water-laden, hydrocarbon polymer which comprises passing said water-laden polymer between two smooth counter-rotating, horizontally disposed parallel rolls, maintaining the distance between said rolls from about 0.001 to about 0.010 inch, maintaining one of said rolls cool, at a temperature between about 35° F. and about 80° F., and maintaining the other of said rolls hot, at a temperature between about 150° F., and about 225° F. whereby water is transferred from the thin polymer layer to the cool roll and the thin polymer layer adheres to the hot roll, continuously removing liquid water which is separated from said water-laden polymer from the surface of said cool roll after said water passes between said rolls and before said water can recontact polymer, and continuously removing substantially dewatered polymer from the surface of said hot roll after said polymer passes between said rolls and before said dewatered polymer can recontact water-laden polymer.

2. The process of removing physically bound water from a solid ethylene polymer containing more than about 50% by weight of water which comprises passing said water-laden polymer between two smooth counter-rotating, horizontally disposed parallel rolls, maintaining the distance between said rolls from about 0.001 to about 0.010 inch, maintaining one of said rolls cool, at a temperature between about 35° F. and about 80° F., and maintaining the other of said rolls hot, at a temperature between about 150° F. and about 225° F. whereby water is transferred from the thin polymer layer to the cool roll and the thin polymer layer adheres to the hot roll, continuously removing liquid water from the surface of said cool roll after said water passes between said rolls and before said water can recontact polymer, and continuously removing substantially dewatered polymer from the surface of said hot roll after said polymer passes between said rolls and before said dewatered polymer can recontact water-laden polymer.

3. The method of claim 2 wherein the speed of rotation of said rolls is not substantially greater than about 12 revolutions per minute.

References Cited in the file of this patent

UNITED STATES PATENTS

| | | | |
|---|---|---|---|
| 229,446 | Miller et al. | June 29, | 1880 |
| 695,585 | Stanley | Mar. 18, | 1902 |
| 1,643,643 | Schneidler | Sept. 27, | 1927 |
| 2,475,628 | McSweeney | July 12, | 1949 |
| 2,475,643 | Seebold | July 12, | 1949 |
| 2,566,943 | King | Sept. 4, | 1951 |
| 2,624,913 | Montross et al. | Jan. 13, | 1953 |